United States Patent
Jung

(10) Patent No.: US 7,307,728 B2
(45) Date of Patent: Dec. 11, 2007

(54) METHOD AND APPARATUS FOR GENERATING COLOR REAPPEARANCE PECULIARITY PROFILE, AND METHOD AND APPARATUS FOR REAPPEARING COLOR USING PLURALITY OF COLOR REAPPEARANCE PECULIARITY PROFILES

(75) Inventor: Son-hae Jung, Gyeonggi-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 448 days.

(21) Appl. No.: 10/801,824

(22) Filed: Mar. 17, 2004

(65) Prior Publication Data
US 2004/0199355 A1    Oct. 7, 2004

(30) Foreign Application Priority Data
Apr. 1, 2003  (KR)  ...................... 10-2003-0020439
May 15, 2003  (KR)  ...................... 10-2003-0030896

(51) Int. Cl.
*G01J 3/50*  (2006.01)

(52) U.S. Cl. ...................... 356/402; 356/425; 358/504; 347/19

(58) Field of Classification Search ................ 356/402, 356/425
See application file for complete search history.

(56) References Cited

U.S. PATENT DOCUMENTS

| | | | |
|---|---|---|---|
| 5,781,206 A * | 7/1998 | Edge | 347/19 |
| 6,075,888 A * | 6/2000 | Schwartz | 382/167 |
| 6,580,524 B1 * | 6/2003 | Weichmann et al. | 358/1.9 |
| 6,762,858 B2 * | 7/2004 | Haro | 358/1.9 |
| 6,947,174 B1 * | 9/2005 | Chen et al. | 358/1.9 |
| 2003/0193688 A1 * | 10/2003 | Namikata | 358/1.15 |
| 2004/0150858 A1 * | 8/2004 | Cholewo et al. | 358/3.06 |

FOREIGN PATENT DOCUMENTS

| | | |
|---|---|---|
| JP | 2002-51230 | 2/2002 |
| JP | 2002-118765 | 4/2002 |
| KR | 1990-0016818 | 11/1990 |

OTHER PUBLICATIONS

Korean Office Action dated Apr. 30, 2005 cited in corresponding Korean Patent Application No. 10-2003-0030896.

* cited by examiner

*Primary Examiner*—F. L. Evans
(74) *Attorney, Agent, or Firm*—Staas & Halsey LLP

(57) ABSTRACT

A method and an apparatus for generating color reappearance peculiarity profile and a method and an apparatus for reappearing color using a plurality of color reappearance peculiarity profiles are provided. The method of generating the color reappearance peculiarity profile includes: outputting a color standard scale having a set color information value through a color reappearance device; measuring actual color information value of the outputted color standard scale; calculating a color information difference value between the set color information value and the measured actual color information value of the color standard scale; and generating the color reappearance peculiarity profile which instructs the color reappearance device to reappear an optimized color using the color information difference value. Thus, the color reappearance optimized for a color reappearance device such as a color printer, a color copying machine, a monitor, or a scanner is performed by generating optimized color profiles.

12 Claims, 4 Drawing Sheets

US 7,307,728 B2

METHOD AND APPARATUS FOR GENERATING COLOR REAPPEARANCE PECULIARITY PROFILE, AND METHOD AND APPARATUS FOR REAPPEARING COLOR USING PLURALITY OF COLOR REAPPEARANCE PECULIARITY PROFILES

CROSS-REFERENCE TO RELATED APPLICATIONS

This application claims the priorities of Korean Patent Applications No. 2003-20439, filed on Apr. 1, 2003 and No. 2003-30896, filed on May 15, 2003, in the Korean Intellectual Property Office, the disclosures of which are incorporated herein by reference.

BACKGROUND OF THE INVENTION

1. Field of the Invention

The present invention relates to a color reappearance, that is, a printing operation, a copying operation, or an image scanning operation of a color reappearance devices such as a color printer, a color copying machine, a monitor, or a scanner, and more particularly, to a method and an apparatus for generating a color reappearance peculiarity profile for color reappearance optimized for respective color reappearance devices, and a method and an apparatus for reappearing color using a plurality of color reappearance peculiarity profiles optimized for the color reappearance devices.

2. Description of the Related Art

Color reappearance devices such as color printers, color copying machines, monitors, and scanners, which are connected to a computer, perform color reappearing operations. For example, when a printing process is started through a color printer, which is connected to the computer, a print operation begins after a user selects options in a printer driver entry-information of the computer. Further, the color printer performs the color printing operation according to the selected options. A color management exists in the options selected from the printer driver entry-information. The color management includes color profile information, by which color information of printing-objected material is selectable, to reappear the color by an arbitrary color reappearance peculiarity profile or the color reappearance peculiarity profile set by the user.

However, the conventional color reappearance devices are not uniform in the operation to reappear the color since the conventional color reappearance devices are manufactured in different companies or since differences exist in color reappearance engines thereof even if the color reappearance devices are of a common type and/or from the same company. To standardize color reappearance, International Color Consortium (ICC) suggested a color reappearance peculiarity profile standard including features of color reappearance devices, and manufacturers should manufacture the color reappearance peculiarity profile, which provide general purpose reappearance devices, according to the features of the color reappearance devices based on the above standard to perform the color reappearance. That is, the color reappearance peculiarity profile used to reappear the colors is not optimal for the all color reappearance devices, but satisfies the general purpose of the color reappearance devices. Therefore, even though a color printing operation is performed using two color printers of a common company and of a common type, results of a common quality from the two conventional color reappearance devices cannot be obtained.

SUMMARY OF THE INVENTION

The present invention provides a method of generating color reappearance peculiarity profile by which optimal color reappearance is performable in various color reappearance devices.

The present invention also provides a method of reappearing color using a plurality of color reappearance peculiarity profiles corresponding to the color reappearance devices.

The present invention also provides an apparatus to generate color reappearance peculiarity profile by which optimal color reappearance is performable in various color reappearance devices.

The present invention also provides an apparatus for reappearing color using a plurality of color reappearance peculiarity profiles corresponding to the color reappearance peculiarity profiles.

Additional aspects and/or advantages of the invention will be set forth in part in the description which follows and, in part, will be obvious from the description, or may be learned by practice of the invention.

According to an aspect, a method of generating a color reappearance peculiarity profile is provided including: outputting a color standard scale having a set color information value through a color reappearance device; measuring an actual color information value of the outputted color standard scale; calculating a color information difference value between the set color information value and the measured actual color information value of the color standard scale; and generating the color reappearance peculiarity profile to instruct the color reappearance device to reappear an optimized color using the color information difference value.

According to another aspect, a method of reappearing color using a plurality of color reappearance peculiarity profiles including: receiving a demand for a reappearing color of a color reappearance device; displaying a list of the plurality of color reappearance peculiarity profiles instructing the color reappearance device to reappear an optimized color; and performing a color reappearance of the color reappearance device using a specified color reappearance peculiarity profile selected by a user in the displayed list of the color reappearance peculiarity profiles.

According to another aspect, an apparatus for generating a color reappearance peculiarity profile including: a color standard scale output instructing unit to instruct a color reappearance device to output a color standard scale having a set color information value; a color information difference value calculating unit to calculate a color information difference value between an actual color information value corresponding to a measured color information value of the outputted color standard scale and the set color information value; and a peculiarity profile generating unit to generate the color reappearance peculiarity profile instructing the color reappearance device to reappear an optimized color using the calculated color information difference value.

According to another aspect, an apparatus for reappearing color using a plurality of color reappearance peculiarity profiles including: a profile storing unit to store the plurality of color reappearance peculiarity profiles instructing a color reappearance device to reappear an optimized color and a color reappearance common profile instructing the color reappearance device to reappear color generally; a color reappearance demand sensing unit to sense whether or not the color reappearance of the color reappearance device is demanded; a display instructing unit to demand to display a list of the plurality of color reappearance peculiarity profiles and the color reappearance common profile; and a color reappearance instructing unit to instruct the color reappearance device to reappear colors using a specified color reappearance peculiarity profile selected by a user in the list of the plurality of color reappearance peculiarity profiles or the color reappearance common profile.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
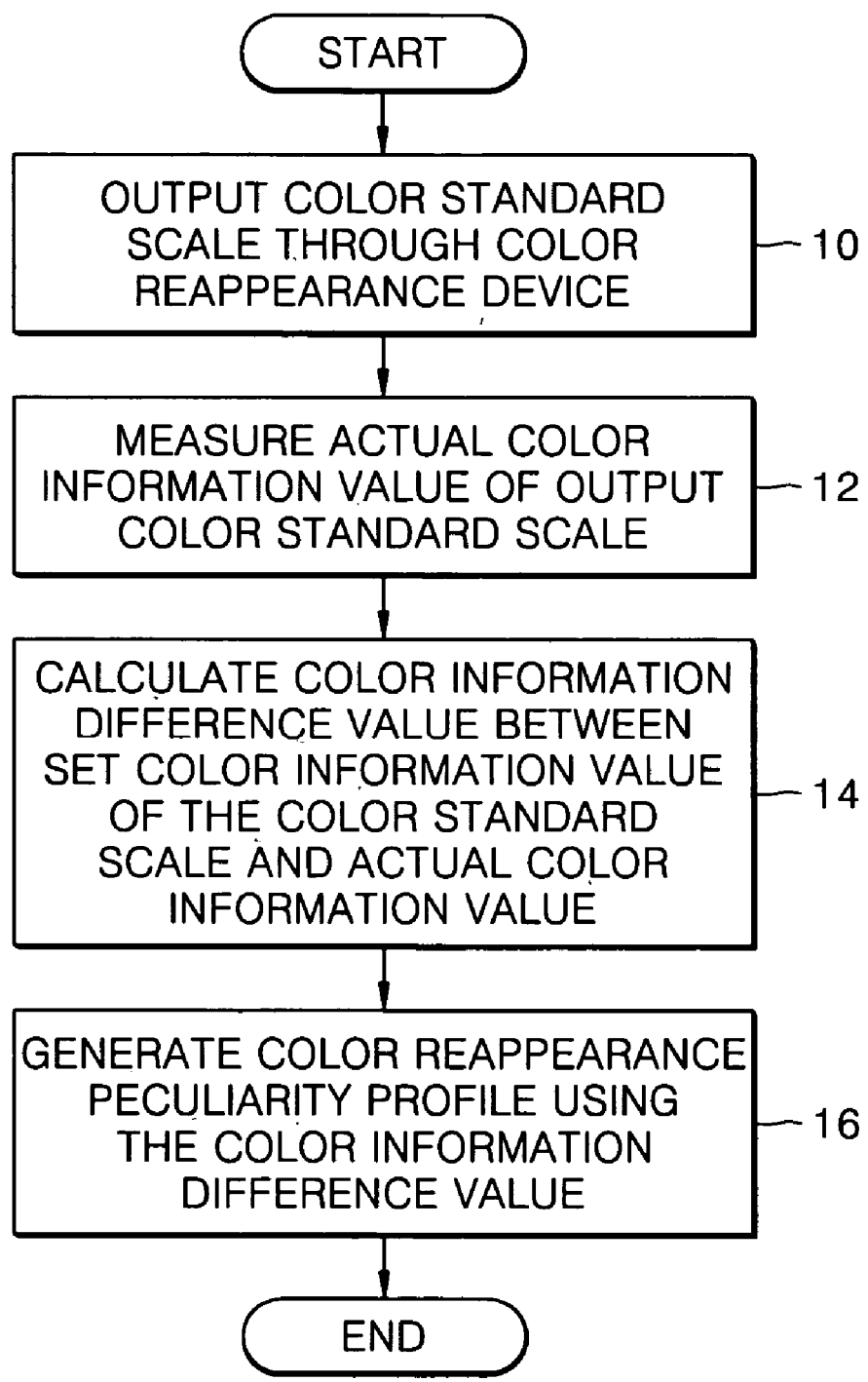
FIG. 1 is a flow chart illustrating a method of generating color reappearance peculiarity profiles according to a first embodiment of the present invention.

Reference will now be made in detail to the embodiments of the present invention, examples of which are illustrated in the accompanying drawings, wherein like reference numerals refer to the like elements throughout. The embodiments are described below to explain the present invention by referring to the FIGS.

FIG. 1 is a flow chart illustrating a method of generating a color reappearance peculiarity profile according to a first embodiment of the present invention, and includes generating the color reappearance peculiarity profile by calculating a difference between an actual color information value of a color standard scale outputted from a color reappearance device and a set color information value of the color standard scale, and storing the color reappearance peculiarity profiles (operations 10 through 18).

The color standard scale having the set color information value is outputted from the color reappearance device (operation 10). The color standard scale includes patches for discretionary colors. That is, the color standard scale defines a color patch having color information which becomes a standard when the colors are reappeared by the color reappearance device. Each of the color patches of the color standard scale has a respective color information value. The respective color information values of the color patches are referred to as set color information values. The set color information value is a value numeric value corresponding to the color information. In operation 10, the color standard scale is printed, displayed, or copied through the color reappearance device such as a color printer, a color copying machine, a scanner, or a monitor.

After performing operation 10, an actual color information value of the outputted color standard scale is measured (operation 12). For example, the color information value of the color standard scale printed by the color printer is measured. The color information value is measured using a color information value instrument. The color information value measured by the color information value instrument is referred to as an actual color information value. The set color information value is a numeric value corresponding to the color information.

After performing operation 12, a color information difference value between the set color information value and the measured actual color information value of the color standard scale is calculated (operation 14). Since the set color information value and the actual color information value of the color standard scale are the numerical values, the color information difference value is calculatable by subtracting the actual color information value from the set color information value.

Further, the color reappearance peculiarity profile to instruct the color reappearance device to reappear the optimal color is generated (operation 16). The color reappearance peculiarity profile is to reappear the optimal color, which is displayable by the color reappearance device to output the color standard scale in operation 10. That is, the color reappearance peculiarity profile is an International Color Consortium (ICC) file or an image color matching (ICM) file which is most suitable for a specified color reappearance device. The ICC file or the ICM file is a data file representing color representing features of the color reappearance device (such as the color printer, the scanner, the color copying machine, or the monitor), and includes a profile by which an exact color representation of the color reappearance device may be produced. The ICC file or the ICM file has a file extension such as "*.icc" or "*.icm".

A method of reappearing color using the plurality of color reappearance peculiarity profiles will be described with reference to accompanying FIGS. 1-4 as follows.

Figure 2:
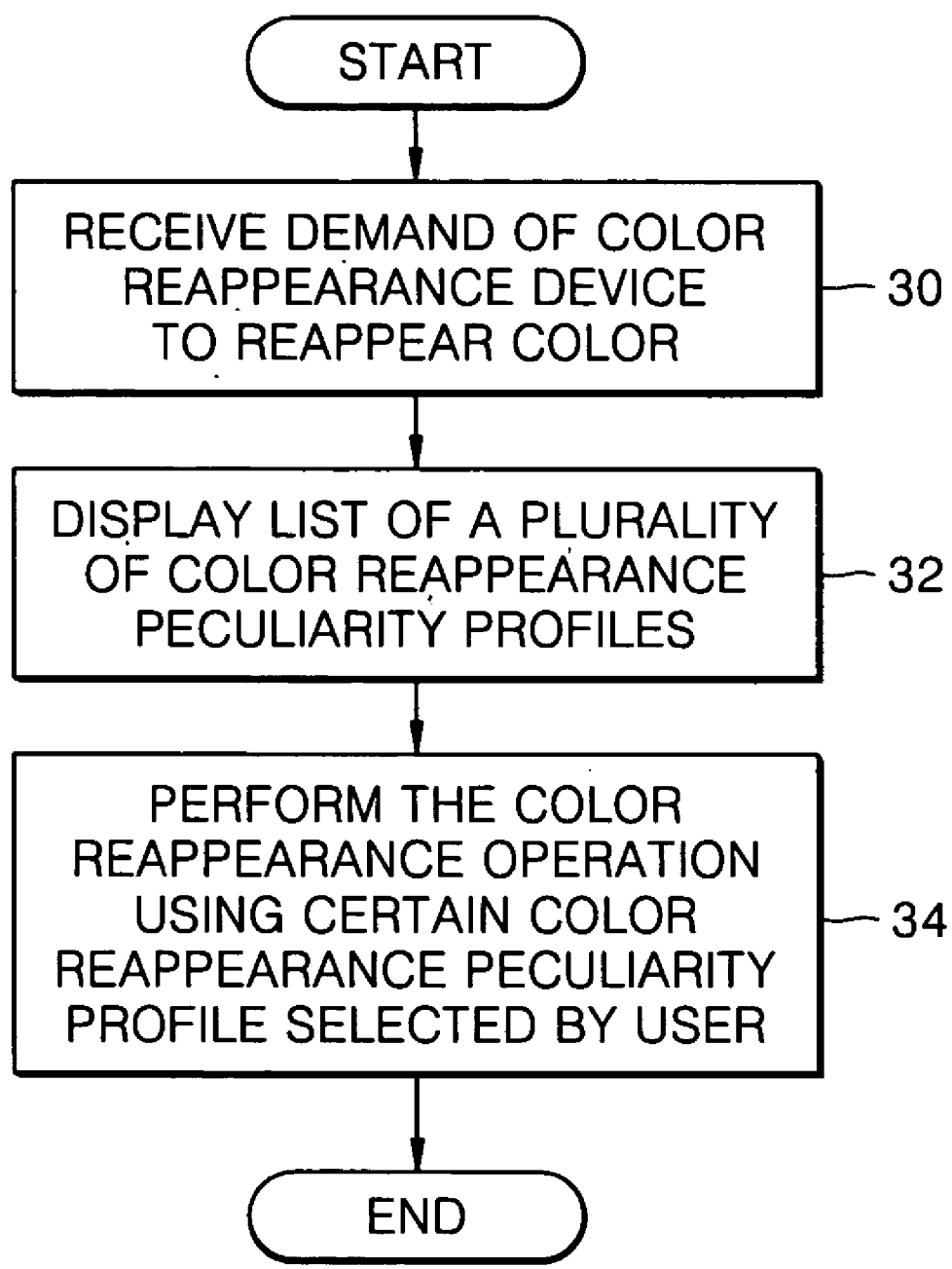
FIG. 2 is a flow chart illustrating a method of reappearing color using a plurality of color reappearance peculiarity profiles according to a second embodiment of the present invention.

FIG. 2 is a flow chart illustrating the method of reappearing color using the plurality of color reappearance peculiarity profiles according to a second embodiment of the present invention, and includes receiving a demand to reappear the color from a color reappearance device and performing a color reappearance operation using a predetermined color reappearance peculiarity profile (operations 30 through 34).

A demand to reappear the color of the color reappearance device is received (operation 30). For example, a demand to print using a color printer of the user is received through a printer driver of a computer connected to the color printer.

After performing operation 30, a list including a plurality of color reappearance peculiarity profiles instructing the color reappearance device to reappear an optimized color is displayed (operation 32). The plurality of color reappearance peculiarity profiles instructing the color reappearance device to reappear the optimized color are generated by the method of generating color reappearance peculiarity profiles shown in FIG. 1. The plurality of color reappearance peculiarity profiles are generated by a difference between the actual color information values of the color standard scales output from the plurality of color reappearance devices and the set color information values of the color standard scales. Some of the color reappearance peculiarity profiles, which are selected in a discretionary manner in consideration of a limit of the color reappearance of the color reappearance device, are stored in a predetermined storage space, and a list thereof is displayed by a color reappearance demand sensing unit 210 (see FIG. 5).

A color reappearance common profile to instruct a general color reappearance of the color reappearance device is also displayed. The color reappearance common profile is the ICC file or the ICM file applied generally to a same or a similar color reappearance device.

Figure 3:
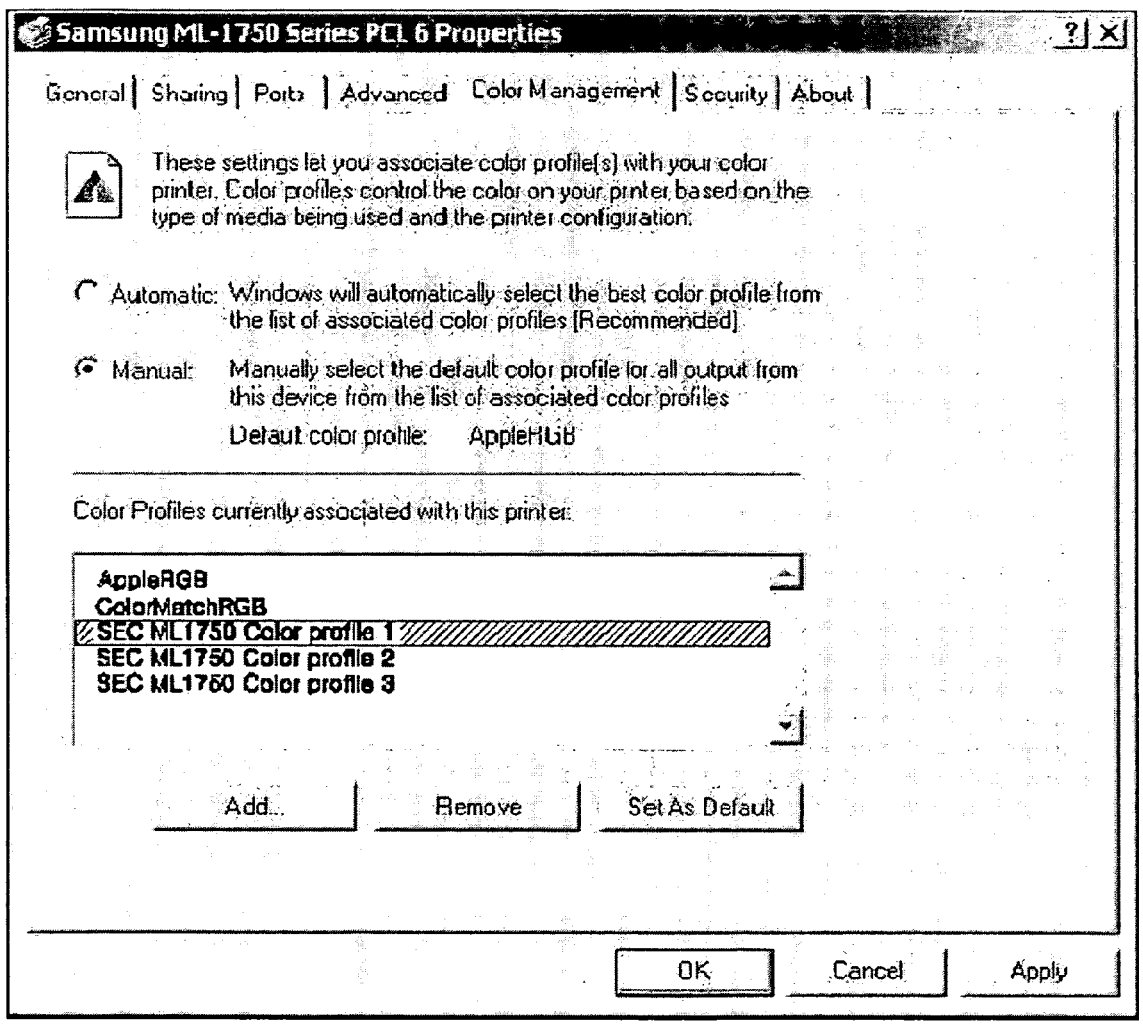
FIG. 3 is a view of displayed lists in which the plurality of color reappearance peculiarity profiles and color reappearance common profiles are displayed.

FIG. 3 is a view of a status menu in which a plurality of color reappearance peculiarity profiles and the color reappearance common profiles are displayed. In FIG. 3, "SEC ML1750 color profile 1, SEC ML1750 color profile 2, and SEC ML1750 color profile 3" are the plurality of color reappearance peculiarity profiles. "Apple RGB" is the list of color reappearance common profile and is set to be a default.

After performing operation 32, the color reappearance of the color reappearance device is performed using predetermined color reappearance peculiarity profiles selected by a user among the displayed color reappearance peculiarity profiles (operation 34). For example, if the "SEC ML1750 color profile 1," corresponding to a specified color reappearance peculiarity profile, is selected by the user through a color management of a printer driver, the color printing, which is optimized for the color printer is performed using the "SEC ML1750 color profile 1" of the color printer. The plurality of color reappearance peculiarity profiles including the specified color reappearance peculiarity profile are stored in a predetermined storing space of the computer. For example, the plurality of color reappearance peculiarity profiles are stored in a local driver of a window so as to perform the color printing operation by applying the color reappearance peculiarity profile to the printer driver. If the "Apple RGB," corresponding to the color reappearance common profile, is selected by default or by the user, the color printing operation applied generally to the color printer is performed using the "Apple RGB" of the color printer.

An apparatus for generating a color reappearance peculiarity profile according to a third embodiment of the present invention will be described as follows.

Figure 4:
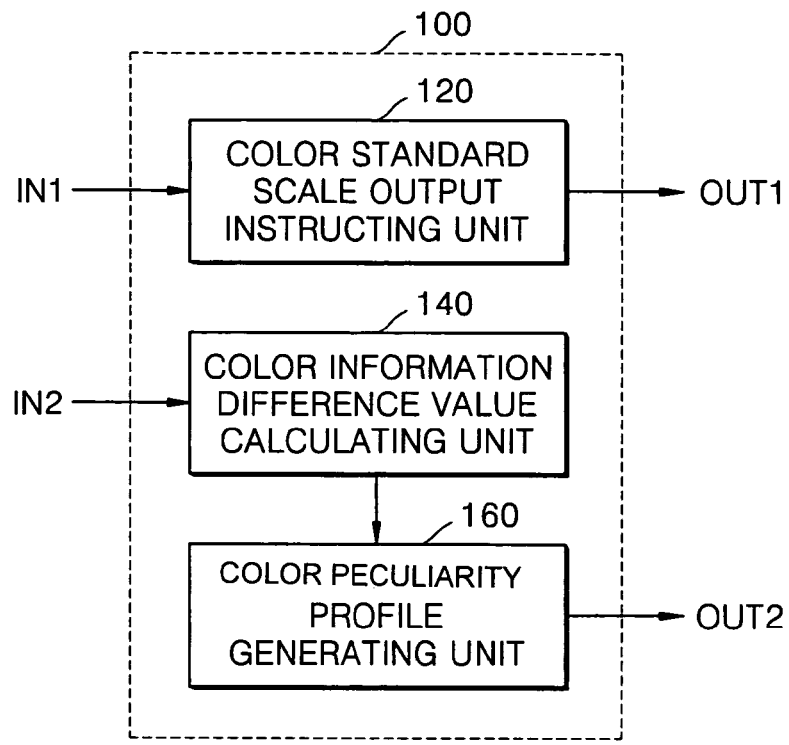
FIG. 4 is a block diagram of an apparatus for generating the color reappearance peculiarity profiles according to a third embodiment of the present invention.

FIG. 4 is a block diagram of the apparatus for generating the color reappearance peculiarity profile. In FIG. 4, a computer 100 includes a color standard scale output instructing unit 120, a color information difference value calculating unit 140, and a color peculiarity profile generating unit 160.

The computer 100 is a general purpose personal computer (PC) which is connected to a color reappearance device (not shown) to control a color reappearance operation of the color reappearance device.

The color standard scale output instructing unit 120 provides commands (i.e., instructions) to output the color standard scale having set color information value through the color reappearance device. The color standard scale output instructing unit 120 instructs to output the color standard scale having the set color information value through the color reappearance device by responding to a signal demanding a generation of a color reappearance peculiarity profile input through an input terminal IN1, and transmits a command result to the color reappearance device through an output terminal OUT1.

The color information difference value calculating unit 140 calculates a difference between an actual color information value corresponding to a measured color information value of the output color standard scale and set information value. The color information value of the output color standard scale is measured by a color instrument (not shown). The color information difference value calculating unit 140 receives the actual color information value of the color standard scale, which is measured by the color instrument, through an input terminal IN2, calculates the difference between the set color information value stored therein and the actual color information value, and outputs a calculated result to the color peculiarity profile generating unit 160.

The color profile generating unit 160 generates the color reappearance peculiarity profile to instruct to perform the color reappearance operation optimized for the color reappearance device. The color peculiarity profile generating unit 160 receives the color information difference value calculated in the color information difference value calculating unit 140, generates the color reappearance peculiarity profile to instruct to perform the color reappearance operation optimized for the color reappearance device using the color information difference value, and outputs the generated color reappearance peculiarity profile through an output terminal OUT2. The color reappearance peculiarity profile is the ICC file or the ICM file to reappear the optimized color represented by the color reappearance device which outputted the color standard scale.

An apparatus for reappearing color using the plurality of color reappearance peculiarity profiles will be described as follows.

Figure 5:
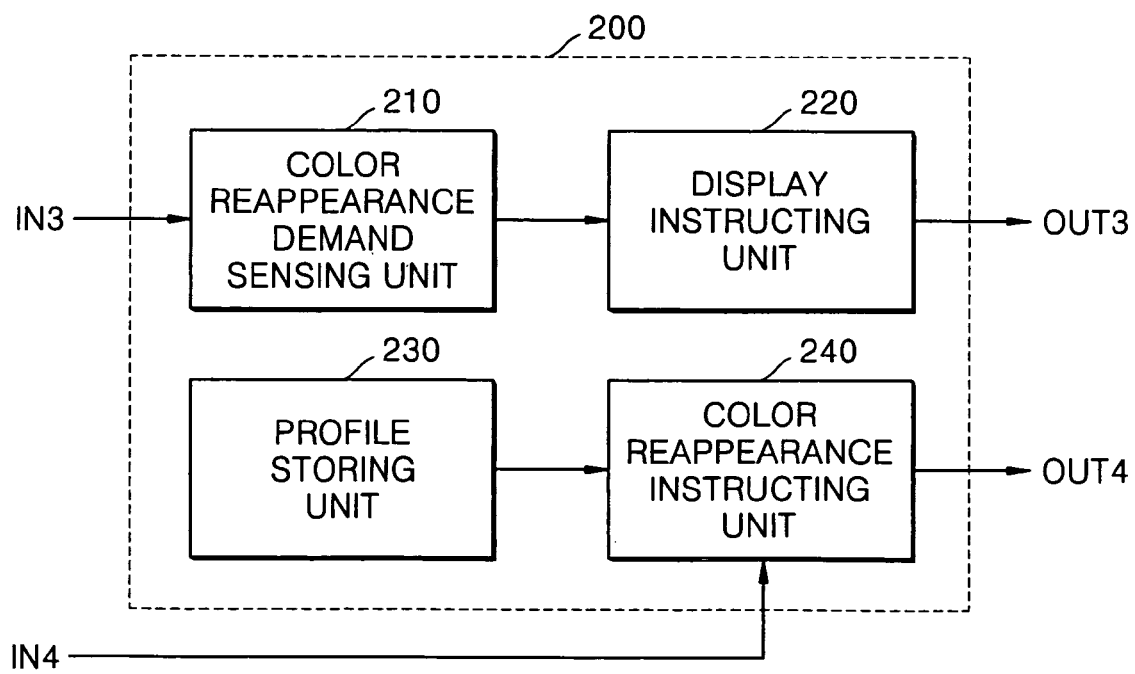
FIG. 5 is a block diagram of an apparatus for reappearing the color using the plurality of color reappearance peculiarity profiles according to a fourth embodiment of the present invention.

FIG. 5 is a block diagram of the apparatus for reappearing the color using the plurality of color reappearance peculiarity profiles according to a fourth embodiment of the present invention. In FIG. 5, a computer 200 includes a color reappearance demand sensing unit 210, a display instructing unit 220, a profile storing unit 230, and a color reappearance instructing unit 240.

The computer 200 is a general purpose personal computer (PC) which is connected to the color reappearance device (not shown) to control a color reappearance operation of the color reappearance device.

The color reappearance demand sensing unit 210 senses whether or not the color reappearance of the color reappearance device is demanded. The color reappearance demand sensing unit 210 senses whether or not the color reappearance of the color reappearance device is demanded in accordance with a color reappearance demand signal of the user input through an input terminal IN3, and outputs a sensed result to the display instructing unit 220.

The display instructing unit 220 instructs to display a list of the plurality of color reappearance peculiarity profiles and the color reappearance common profile. The display instructing unit 220 receives the sensed result from the color reappearance demand sensing unit 210, and outputs a display instructing signal to instruct to display the list of the plurality of color reappearance peculiarity profiles and the color reappearance common profile through an output terminal OUT3. The list of the plurality of color reappearance peculiarity profiles and the color reappearance common profile is displayed by the display instructing signal output through the output terminal OUT3.

The profile storing unit 230 stores the plurality of color reappearance peculiarity profiles and the color reappearance common profile. A conventional profile storing unit of the conventional art only stores the color reappearance common profile which instructs the color reappearance device to reappear the color generally. The color reappearance common profile is not optimally applied for all the color reappearance devices, but satisfies only a general level of color reappearance. However, the profile storing unit 230 of the present invention stores the plurality of color reappearance peculiarity profiles generated by the color reappearance peculiarity profile generating apparatus described above, as well as the color reappearance common profile. For example, the profile storing unit 230 stores the plurality of color reappearance peculiarity profiles and the color reappearance common profile and are displayed in a local driver of a window. The profile storing unit 230 outputs a specified color reappearance peculiarity profile among the stored plurality of color reappearance peculiarity profiles or the color reappearance common profile to the color reappearance instructing unit 240 in accordance with a profile withdrawal signal of the color reappearance instructing unit 240.

The color reappearance instructing unit 240 instructs the color reappearance device to reappear the colors using the specified color reappearance peculiarity profile selected by the user or using the color reappearance common profile. The color reappearance instructing unit 240 requests the specified color reappearance peculiarity profile or the color reappearance common profile of the profile storing unit 230 in accordance with the color reappearance demanding signal of the user using the specified color reappearance peculiarity profile or the color reappearance common profile of the user input through an input terminal IN4, and outputs the color reappearance instructing signal to instruct the color reappearance device to reappear the color using the specified color reappearance peculiarity profile or the color reappearance common profile provided from the profile storing unit 230 through an output terminal OUT4.

As described above, the method and apparatus for generating a color reappearance peculiarity profile, and the method and apparatus to reappear color using a plurality of color reappearance peculiarity profiles generate the color reappearance peculiarity profiles respectively optimized for various color reappearance devices such as a color printer, a color copying machine, a monitor, or a scanner, and output a color reappearance of a high quality optimized for the color reappearance device using the generated plurality of color reappearance peculiarity profiles.

Although a few embodiments of the present invention have been shown and described, it would be appreciated by those skilled in the art that changes may be made in these embodiment without departing from the principles and spirit of the invention, the scope of which is defined in the claims and their equivalents

What is claimed is:

1. A method of reappearing color using a plurality of color reappearance peculiarity profiles, the method comprising:
   receiving a demand to reappear color of a color reappearance device;
   displaying a list of the plurality of color reappearance peculiarity profiles instructing the color reappearance device to reappear an optimized color; and
   performing the color reappearance operation of the color reappearance device using a specified color reappearance peculiarity profile selected by a user in the displayed list of the plurality of color reappearance peculiarity profiles.

2. The method of claim 1, wherein the reappearing of the color further comprises:
   using one of optimized color reappearance peculiarity profiles corresponding to a plurality of color reappearance devices including the color reappearance device.

3. The method of claim 1, wherein the color reappearance device is one of a color printer, a color copying machine, a monitor and a scanner.

4. An apparatus for reappearing color using a plurality of color reappearance peculiarity profiles, the apparatus comprising:
   a profile storing unit to store a plurality of color reappearance peculiarity profiles, which instruct a color reappearance device to reappear an optimized color, and a color reappearance common profile which instructs the color reappearance device to reappear color generally;
   a color reappearance demand sensing unit which senses whether or not the color reappearance of the color reappearance device is demanded;
   a display instructing unit to demand to display a list of the plurality of color reappearance peculiarity profiles and the color reappearance common profile; and
   a color reappearance instructing unit which instructs the color reappearance device to reappear colors using a specified color reappearance peculiarity profile selected by a user in the list of the plurality of color reappearance peculiarity profiles or the color reappearance common profile.

5. The apparatus of claim 4, wherein the profile storing unit stores optimized color reappearance peculiarity profiles corresponding to a plurality of color reappearance devices including the color reappearance device.

6. The apparatus of claim 4, wherein the color reappearance device is one of a color printer, a color copying machine, a monitor and a scanner.

7. A method of reappearing color using a plurality of color reappearance peculiarity profiles generated according to a comparison of a set color information value and a measured actual color information value of the color standard scale, the method comprising:
   displaying a list of the plurality of color reappearance peculiarity profiles to reappear an optimized color; and
   performing a color reappearance operation using a specified color reappearance peculiarity profile selected by a user in the displayed list of the plurality of color reappearance peculiarity profiles.

8. The method of claim 7, wherein each of the color reappearance peculiarity profiles is one of an international color consortium file and an image coloring matching file.

9. The method of claim 7, wherein the reappearing of the color further comprises:
   using one of optimized color reappearance peculiarity profiles corresponding to a plurality of color reappearance devices.

10. An apparatus for reappearing color using a plurality of color reappearance peculiarity profiles generated according to a comparison of a set color information value and a measured actual color information value of the color standard scale, the apparatus comprising:
    a profile storing unit to store the plurality of color reappearance peculiarity profiles to reappear an optimized color, and a color reappearance common profile to reappear color generally;
    a display instructing unit to demand display of a list of the plurality of color reappearance peculiarity profiles and the color reappearance common profile; and
    a color reappearance instructing unit to instruct the color reappearance device to reappear colors using a specified color reappearance peculiarity profile in the list of the plurality of color reappearance peculiarity profiles and of the color reappearance common profile.

11. The apparatus of claim 10, wherein the profile storing unit stores optimized color reappearance peculiarity profiles corresponding to a plurality of color reappearance devices including the color reappearance device.

12. The apparatus of claim 10, wherein each of the color reappearance peculiarity profiles and of the color reappearance common profile, respectively, is one of an international color consortium file and an image color matching file.

\* \* \* \* \*

UNITED STATES PATENT AND TRADEMARK OFFICE
CERTIFICATE OF CORRECTION

PATENT NO. : 7,307,728 B2 Page 1 of 1
APPLICATION NO. : 10/801824
DATED : December 11, 2007
INVENTOR(S) : Son-hae Jung It is certified that error appears in the above-identified patent and that said Letters Patent is hereby corrected as shown below:

Column 8, Line 33, change "coloring" to --color--.

Signed and Sealed this

Thirteenth Day of May, 2008

JON W. DUDAS
*Director of the United States Patent and Trademark Office*